(12) United States Patent
Miura

(10) Patent No.: US 11,600,868 B2
(45) Date of Patent: Mar. 7, 2023

(54) METHOD AND SYSTEM FOR PRODUCING NONAQUEOUS ELECTROLYTE SECONDARY BATTERY

(71) Applicant: TOYOTA JIDOSHA KABUSHIKI KAISHA, Toyota (JP)

(72) Inventor: Takashi Miura, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 853 days.

(21) Appl. No.: 16/442,700

(22) Filed: Jun. 17, 2019

(65) Prior Publication Data

US 2019/0393564 A1 Dec. 26, 2019

(30) Foreign Application Priority Data

Jun. 22, 2018 (JP) .............................. JP2018-118661

(51) Int. Cl.

| | |
|---|---|
| *H01M 10/44* | (2006.01) |
| *H01M 4/04* | (2006.01) |
| *H01M 4/133* | (2010.01) |
| *H01M 4/62* | (2006.01) |
| *H01M 4/583* | (2010.01) |
| *H01M 4/1393* | (2010.01) |
| *H01M 10/058* | (2010.01) |
| *H01M 4/02* | (2006.01) |

(52) U.S. Cl.
CPC ....... *H01M 10/446* (2013.01); *H01M 4/0445* (2013.01); *H01M 4/133* (2013.01); *H01M 4/1393* (2013.01); *H01M 4/583* (2013.01); *H01M 4/628* (2013.01); *H01M 10/058* (2013.01); *H01M 2004/027* (2013.01)

(58) Field of Classification Search
None
See application file for complete search history.

(56) References Cited

U.S. PATENT DOCUMENTS

2012/0141869 A1* 6/2012 Takahata ............... H01M 10/44
429/188

FOREIGN PATENT DOCUMENTS

JP  2010-287512 A  12/2010

* cited by examiner

*Primary Examiner* — Tracy M Dove
(74) *Attorney, Agent, or Firm* — Sughrue Mion, PLLC

(57) ABSTRACT

Provided is a method for producing a nonaqueous electrolyte secondary battery, and a production system therefor, that allow forming a good SEI film in a shorter time. The production method includes an assembly step, an initial charging step and a high-temperature aging step. At least one from among the initial charging step and the high-temperature aging step has the following sub-steps: a step of performing an AC impedance measurement on the nonaqueous electrolyte secondary battery and, on the basis of the AC impedance measurement, calculating an ionic conductivity of an SEI film that is formed the surface of a negative electrode of the nonaqueous electrolyte secondary battery; and a step of determining whether the calculated ionic conductivity falls within a predetermined range or not, and terminating the initial charging step or the high-temperature aging step when the ionic conductivity falls within the predetermined range, and continuing the initial charging step or the high-temperature aging step when the ionic conductivity does not fall within the predetermined range.

5 Claims, 10 Drawing Sheets

METHOD AND SYSTEM FOR PRODUCING NONAQUEOUS ELECTROLYTE SECONDARY BATTERY

CROSS-REFERENCE

The present application claims priority to Japanese Patent Application No. 2018-118661 filed on Jun. 22, 2018, the entire contents whereof are incorporated into the present specification by reference.

BACKGROUND

1. Technical Field

The present art relates to a method and a system for producing a nonaqueous electrolyte secondary battery.

2. Background

Nonaqueous electrolyte secondary batteries that are utilized in a fashion where the battery is charged/discharged rapidly, for instance in power sources for vehicle drive, have specific problems compared to secondary batteries used for other applications, in that the electrolyte in an electrolyte solution precipitates readily on electrode surfaces during charging or discharge at high current densities. It is therefore important that a good solid electrolyte interface (SEI) film be formed on the surface of electrodes, through initial charging processing, in secondary batteries for such kind of applications.

It is ordinarily appropriate to keep the charging rate during initial charging at about 0.5 C or less, in order to form an SEI film with little unevenness. For instance Japanese Patent Application Publication No. 2010-287512 discloses a method that involves using a film-forming agent such as a dicarboxylic acid group-containing lithium salt, and performing initial charging at a rate of about 0.1 to 10 C, followed by holding of a temperature range of 50 to 60° C. for 6 to 24 hours. The above citation indicates that a good SEI film can be formed by performing an aging process at high temperature, after formation of the SEI film.

Charging at a low rate of about 0.1 to 0.5 C in order to form a good SEI film, however, translates into a long time required for one full charge, of 10 to 2 hours in a simple calculation. Meanwhile, it was found that upon initial charging at a high rate, for instance of about 1 to 10 C, reliable formation of a sufficiently good SEI film was difficult to achieve due to the occurrence of unevenness in the formation of the SEI film, even when high-temperature aging was carried out after initial charging. In particular, the formation conditions of the SEI film and the high-temperature aging conditions may vary depending not only on the film-forming agent, but also depending for instance on material conditions of a positive electrode active material, a negative electrode active material, an electrolyte solution, as well as on design condition such as battery build, and also depending for instance on the battery production equipment. In actual instances, therefore, a good SEI film may fail in actuality to be formed, and yield may drop in some secondary batteries, when attempting to form an SEI film in the shortest possible time with a view to increasing mass productivity of secondary batteries.

SUMMARY

The present art, arrived at in order to solve the above conventional problems, aims at providing a method for producing a nonaqueous electrolyte secondary battery, and a production system therefor, that allow forming a good SEI film in a shorter time.

To solve the above problems, the art disclosed herein provides a method for producing a nonaqueous electrolyte secondary battery. The production method includes an assembly step of assembling a nonaqueous electrolyte secondary battery (hereafter also referred to simply as "battery" or "secondary battery") in which a positive electrode, a negative electrode and a nonaqueous electrolyte solution are accommodated in a battery case; an initial charging step of performing initial charging on the battery after assembly, to form an SEI film on the surface of the negative electrode; and a high-temperature aging step of holding, at a high temperature, the battery after initial charging. At least one from among the initial charging step and the high-temperature aging step has the following sub-steps: at a predetermined potential, performing an AC impedance measurement on the nonaqueous electrolyte secondary battery while maintaining the potential, and calculating an ionic conductivity of the SEI film formed on the surface of the negative electrode of the nonaqueous electrolyte secondary battery, on the basis of the AC impedance measurement; and a step of determining whether the calculated ionic conductivity falls within the predetermined range or not, and maintaining the potential when the ionic conductivity does not fall within the predetermined range, and terminating the maintaining of the potential when the ionic conductivity falls within the predetermined range.

In the above production method an SEI film is formed, through initial charging, on the surface of a negative electrode, and the SEI film is modified through high-temperature aging. The properties of the SEI film during initial charging and high-temperature aging are evaluated non-destructively and on-site through calculation of the ionic conductivity of the SEI film in accordance with an AC impedance method. In other words, the film quality of the SEI film is checked directly using ionic conductivity as an indicator. Specifically, organic matter such as additives and electrolyte solution components that come into contact with an electrode active material, at or above a predetermined potential, can decompose during initial charging of the battery. These decomposition products become deposited, in the form of an SEI film, on the surface of the electrode active material. The SEI film is made up of a mixture of decomposition products of for instance electrolyte solution components and additives. The SEI film does not have electron conductivity, but nevertheless lets ions through, since the SEI film is not a complete continuous film. Therefore, the SEI film allows stabilizing and inactivating the electrode active material surface, thus suppressing excessive decomposition of for instance electrolyte solution components. In high-temperature aging, film quality of the SEI film is improved through decomposition of excess components of the SEI film.

The inventors found that in the stage of formation of the SEI film the higher is the density with which the SEI film is formed uniformly, the smaller becomes the amount of electrolyte ions that can pass through the SEI film, and the lower becomes the ionic conductivity of the SEI film. The inventors also found that the better the film quality of the SEI film elicited through high-temperature aging, the lower becomes the resistance to passage of electrolyte ions through the SEI film, and the higher becomes the ionic conductivity. The state of the SEI film, in particular film homogeneity, can thus be suitably evaluated using ionic conductivity as an indicator. On the basis of the above findings the art disclosed herein makes it possible to detect, in accordance with an AC impedance method, formation and modification of a good SEI film, and to shorten the time required for formation and modification of a good SEI film to a shortest time. By extension, this allows producing a nonaqueous electrolyte secondary battery of long life and stable high-rate input-output characteristics, more quickly and at a lower cost than is conventionally the case.

In one implementation of the production method disclosed herein, the initial charging step includes the above sub-steps. The predetermined potential is set to fall within a voltage range for forming a coating film in which the SEI film becomes formed on the surface of the negative electrode. The predetermined range of the ionic conductivity is equal to or lower than a first ionic conductivity. The first ionic conductivity is for instance ionic conductivity calculated on the basis of an AC impedance method for a good SEI film formed beforehand through initial charging of a battery of predetermined configuration, under suitable conditions. Thanks to this feature, the properties of an SEI film formed through initial charging can be evaluated conveniently and properly.

In one implementation of the production method disclosed herein, the high-temperature aging step includes the above sub-steps. The predetermined potential is set within a voltage range for modification in which the SEI film is modified. The predetermined range of the ionic conductivity is equal to or higher than a second ionic conductivity. The second ionic conductivity is for instance ionic conductivity calculated on the basis of an AC impedance method, for a good SEI film having been further modified by performing beforehand high-temperature aging, under suitable conditions, on a battery of predetermined configuration in which a good SEI film has been formed through initial charging. Such a feature allows evaluating conveniently and properly the properties of the SEI film modified through high-temperature aging.

In one implementation of the production method disclosed herein, the negative electrode contains a carbon material as the negative electrode active material. Stabilization of the negative electrode through formation of a good SEI film is essential and important, given for instance that graphite, which is widely used as a negative electrode active material in lithium ion batteries, exhibits a very strong reducing power accompanying lithium ion intercalation derived from charging. Therefore, the advantages of the art disclosed herein is brought out very effectively in a case where the art is aimed at producing a nonaqueous electrolyte secondary battery that contains a carbon material as the negative electrode active material.

In one implementation of the production method disclosed herein, the nonaqueous electrolyte solution contains an oxalato complex compound that contains at least one of a boron atom and a phosphorus atom, as a film-forming agent for forming the SEI film. This allows forming a good SEI film on the electrode surface, at a potential sufficiently lower than the decomposition potentials of widely used electrolyte solutions such as ethylene carbonate.

In one implementation of the production method disclosed herein, the sub-steps are executed repeatedly at a predetermined interval. Such a feature allows repeatedly re-calculating the ionic conductivity of the SEI film formed on the negative electrode surface, within the battery case, using an impedance measuring device. As a result a good SEI film can be formed and modified reliably and in a shortest time.

In another aspect, the art disclosed herein provides a system for producing a nonaqueous electrolyte secondary battery that has a battery case and a positive electrode, a negative electrode and a nonaqueous electrolyte solution accommodated in the battery case. The system is provided with: a charging/discharging device configured to be capable of charging and discharging the nonaqueous electrolyte secondary battery; an impedance measuring device that measures AC impedance in the nonaqueous electrolyte secondary battery; and a controller that controls the operation of the charging/discharging device and of the impedance measuring device. The controller is provided with: a first controller that controls the charging/discharging device so as to carry out initial charging of the nonaqueous electrolyte secondary battery, to form an SEI film on the surface of the negative electrode; a second controller that controls the charging/discharging device and the impedance measuring device so that, at a first potential, an AC impedance measurement is performed on the nonaqueous electrolyte secondary battery while the first potential is maintained; a determining unit which, on the basis of the result of the AC impedance measurement, calculates an ionic conductivity of the SEI film formed on the surface of the negative electrode, and determines whether or not the calculated ionic conductivity falls within a predetermined range; and a third controller that controls the charging/discharging device so as to maintain the first potential when the determining unit determines that the ionic conductivity does not fall within the predetermined range, and controls the charging/discharging device so as to terminate the maintaining of the first potential when the determining unit determines that the ionic conductivity falls within the predetermined range.

For instance the method for producing a nonaqueous electrolyte secondary battery disclosed herein can be realized conveniently by resorting to the above system. In other words, the above system allows suitably evaluating for instance the degree of formation and film homogeneity of the SEI film, using ionic conductivity as an indicator, in the initial charging step in the production of the nonaqueous electrolyte secondary battery. The time required for forming a good SEI film can be reduced as a result to a shortest time. By extension, this allows producing a nonaqueous electrolyte secondary battery of long life and stable high-rate input-output characteristics, more quickly and at a lower cost than is conventionally the case.

In one implementation of the system disclosed herein, the controller is provided with: a fourth controller that controls the charging/discharging device and the impedance measuring device so that an AC impedance measurement is performed, at a second potential, on the nonaqueous electrolyte secondary battery in a predetermined temperature environment, while the second potential is maintained; and a fifth controller that controls the charging/discharging device so as to continue the second potential when the determining unit determines that the ionic conductivity does not fall within the predetermined range, and controls the charging/discharging device so as to terminate the maintaining of the second potential when the determining unit determines that the ionic conductivity falls within the predetermined range. Such a configuration allows evaluating suitably for instance the film quality and the modification degree of the SEI film, using ionic conductivity as an indicator, in the high-temperature aging step in the production of the nonaqueous electrolyte secondary battery. The time required for modifying a good SEI film can be reduced as a result to a shortest time.

DETAILED DESCRIPTION

Figure 1:
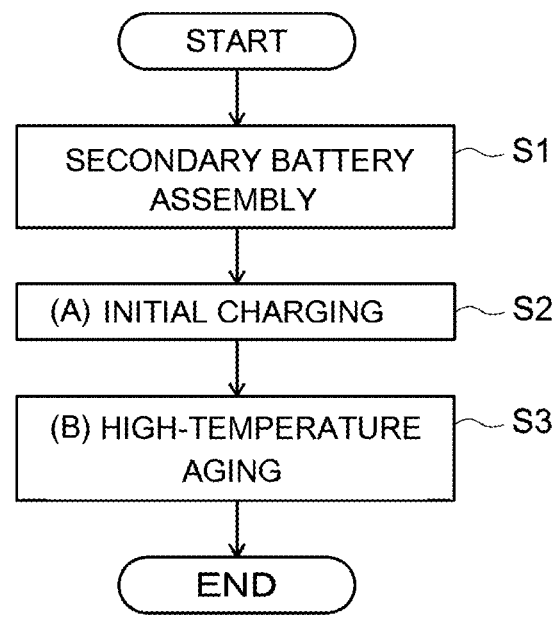
FIG. 1 is a flow diagram of a method for producing a nonaqueous electrolyte secondary battery according to an embodiment.

The method and system for producing a nonaqueous electrolyte secondary battery according to the present art will be explained next on the basis of some embodiments, with reference to accompanying drawings as appropriate. Any features other than the matter specifically set forth in the present specification and that may be necessary for carrying out the disclosure (for instance the structure and production method of a nonaqueous electrolyte secondary battery and not being characterizing features of the present disclosure) can be regarded as instances of design matter for a person skilled in the art based on known art in the relevant technical field. The present art can be realized on the basis of the disclosure of the present specification and common technical knowledge in the relevant technical field. The dimensional relationships (length, width, thickness and so forth) in the drawings below do not necessarily reflect actual dimensional relationships. Unless otherwise stated, in the present specification a numerical value range notated as "X to Y" denotes "a value equal to or larger than X and equal to or smaller than Y".

Figure 2:
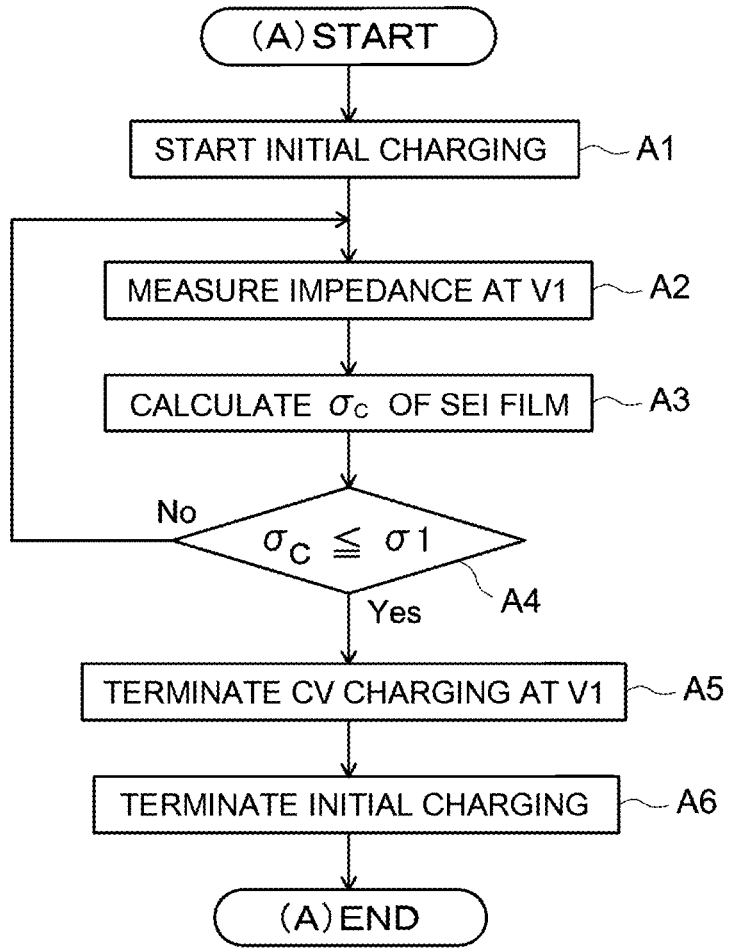
FIG. 2 is a flow diagram illustrating an embodiment of an initial charging step (A) in FIG. 1.
Figure 3:
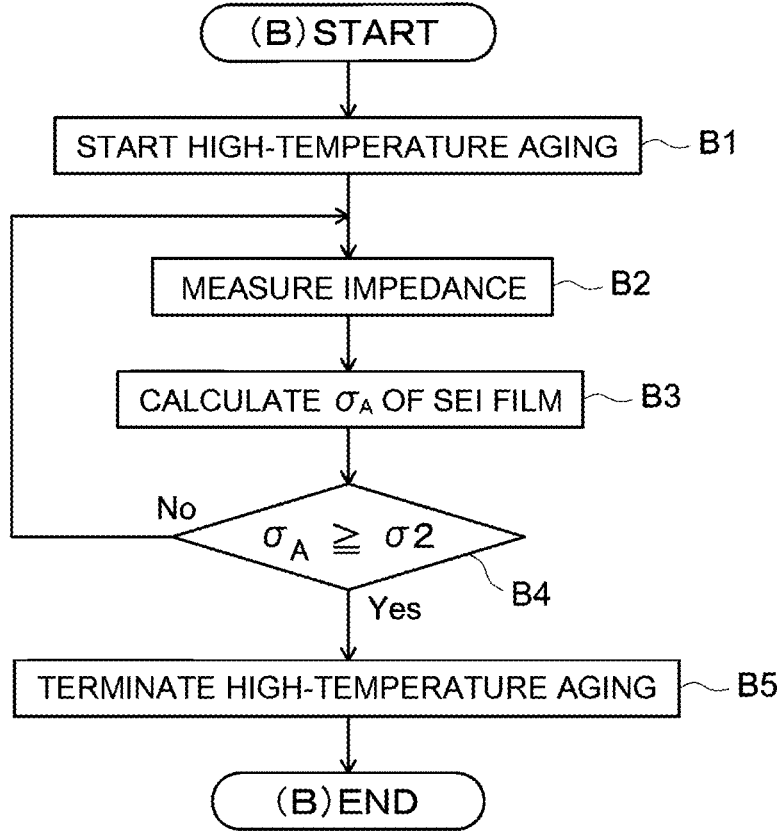
FIG. 3 is a flow diagram illustrating an embodiment of a high-temperature aging step (B) in FIG. 1.

FIG. 1 is a flow diagram of a method for producing a nonaqueous electrolyte secondary battery according to the present embodiment. The present production method includes essentially steps S1 to S3 below. FIG. 2 and FIG. 3 are flow diagrams respectively illustrating, more specifically, an initial charging step (A) corresponding to step S2 and a high-temperature aging step (B) corresponding to step S3.

(S1) secondary battery assembly step
(S2) initial charging step
(S3) high-temperature aging step

S1. Secondary Battery Assembly Step

In step S1 there is assembled a nonaqueous electrolyte secondary battery in which a positive electrode, a negative electrode and a nonaqueous electrolyte solution are accommodated in a battery case. The specific configuration of the nonaqueous electrolyte secondary battery is not particularly limited, so long as the battery can be repeatedly charged and discharged as a result of traffic of electrolyte ions, contained in the nonaqueous electrolyte solution, across the positive electrode and the negative electrode. Typical examples of the nonaqueous electrolyte secondary battery include lithium ion secondary batteries, sodium ion batteries, nickel-hydride batteries and electrical double layer capacitors. In the present specification, the nonaqueous electrolyte secondary battery will be explained on the basis of an example of an instance where the battery is a lithium ion secondary battery that utilizes lithium ions as electrolyte ions.

Although not depicted in a concrete manner, a secondary battery 10 can be assembled by accommodating and hermetically sealing a multilayer-type electrode body as an electric storage element, and a nonaqueous electrolyte solution, inside a battery case. The multilayer-type electrode body can be constructed by alternately stacking a plurality of positive electrode plates and a plurality of negative electrode plates, in a state where the foregoing are insulated from each other by interposed separators. Each positive electrode plate is provided with a plate-like positive electrode collector, and with a porous positive electrode active material layer fixed to the surface of the positive electrode collector. Each negative electrode plate is provided with a plate-like negative electrode collector, and with a porous negative electrode active material layer fixed to the surface of the negative electrode collector. Respective tabs for power collection are provided in the positive electrode collector and the negative electrode collector. Although not limited thereto, the positive and negative active material layers are ordinarily provided on both faces of a collector. Herein one electric storage element is configured through stacking of a positive electrode active material layer on a first face of one positive electrode plate and a negative electrode active material layer on a first face of one negative electrode plate, separated by one separator. The multilayer-type electrode body is then configured through stacking of a plurality of such elements. The nonaqueous electrolyte solution contains for instance a nonaqueous solvent and an electrolyte salt (for instance a lithium salt) capable of forming charge carriers by being dissolved in the nonaqueous solvent, and optionally for instance a film-forming agent that is added to the nonaqueous electrolyte solution, as needed. The nonaqueous electrolyte solution is impregnated into the positive electrode active material layer, the negative electrode active material layer and the separator. In addition to being impregnated into the multilayer-type electrode body, the nonaqueous electrolyte solution may be present in a space between the multilayer-type electrode body and the battery case.

The positive electrode active material layer contains a positive electrode active material. The positive electrode active material is made up of a material capable of storing and releasing lithium ions. A material having a lithium ion storage/release potential that is relatively higher than that of the negative electrode active material described below can be used herein as the positive electrode active material. A lithium-containing compound that contains lithium and one or two or more transition metal elements can be suitably used as the positive electrode active material. Some examples include for instance lithium-transition metal oxides having a crystal structure of layered rock salt type, spinel type or olivine type. Such a lithium-transition metal oxide can be, in concrete terms, a lithium-nickel complex oxide (for instance $LiNiO_2$), a lithium-cobalt complex oxide (for instance $LiCoO_2$), a lithium-manganese complex oxide (for instance $LiMn_2O_4$), or a ternary lithium-containing complex oxide such as a lithium-nickel-cobalt-manganese complex oxide (for instance $LiNi_{1/3}Co_{1/3}Mn_{1/3}O_2$), or an olivine-type iron phosphate ($LiFePO_4$). For instance aluminum, an aluminum alloy, stainless steel or nickel, shaped as a sheet, is appropriately used as the positive electrode collector.

The negative electrode active material layer contains a negative electrode active material. The negative electrode active material is made up of a material capable of storing and releasing lithium ions. A material having a storage/release potential of lithium ions relatively lower than that of the positive electrode active material described above can be used herein as the negative electrode active material. One or two or more of various types of material, such as carbon-based materials, oxide-based materials, metallic materials and amorphous materials, capable of storing and releasing lithium ions, can be used as the negative electrode active material. Some examples of the negative electrode active material include typically carbon materials such as graphite, hardly graphitizable carbon, easily graphitizable carbon and carbon nanotubes, metals such as lithium (Li), silicon (Si) and tin (Sn), and oxides of the foregoing (for instance SiO and $SnO_2$), as well as alloys of a metal and lithium (for instance LiSi, LiSn and LiAl). The advantages of the present art can be brought out more prominently by using for instance natural graphite, which boasts a strong reducing power and which, through storage of lithium ions, exhibits a potential that drops to the vicinity of a lithium-basis potential, or by using amorphous carbon-coated graphite resulting from coating the above natural graphite with amorphous carbon. Copper or a copper alloy, stainless steel or nickel, shaped as a sheet, is suitably used as the negative electrode collector. The art disclosed herein allows forming a coating film uniformly in the thickness direction of the negative electrode active material layer. Accordingly, the art disclosed herein can be applied particularly suitably to secondary batteries that have a thick negative electrode active material layer since a high input/output characteristic is required therefrom. Although not necessarily limited thereto, the average thickness of the negative electrode active material layer may be for instance not about 5 µm or less (for small secondary batteries), but larger than about 5 µm, and may be for instance 10 µm or larger (for instance in high-output batteries for automotive use), and can be typically 50 µm or larger, for instance 100 µm or larger.

The positive and negative active material layers can be configured for instance through binding of respective powdery (particulate) electrode active materials by means of a binder. The binder is not particularly limited, and for instance various organic compounds can be used that have binding properties and can be utilized as binders in this kind of batteries. Examples include polytetrafluoroethylene, polytrifluoroethylene, polyethylene, cellulose resins, acrylic resins, vinyl resins, nitrile rubber, polybutadiene rubber, butyl rubber, polystyrene, styrene-butadiene rubber, styrene-butadiene latex, polysulfide rubber, acrylonitrile butadiene rubber, polyvinyl fluoride, polyvinylidene fluoride (PVDF) and fluororubbers. As the binder there may be used any one of the above types singly, or two or more types in combination. Such a binder can be used for instance in a proportion of 0.5 mass % or higher with respect to 100 mass % as the total amount of the electrode active material layer. The proportion of the conductive material may for instance fall within the range of 0.5 to 10 mass %, or the range of 1 to 5 mass %.

In a case where the electrode active material does not have sufficient electron conductivity, the positive and negative active material layers may contain as needed a conductive material for increasing electron conductivity. The type of the conductive material is not particularly limited, and for instance graphite, carbon black such as acetylene black or Ketjen black, vapor grown carbon fibers, carbon nanotubes, carbon nanofibers and other carbon materials can be suitably used herein. Such a conductive material can be used for instance in a proportion of 1 mass % or higher with respect to 100 mass % as the total of the electrode active material layer. The proportion of the conductive material may for instance fall within the range of 1 to 12 mass %, or the range of 2 to 10 mass %.

A solution resulting from dissolution or dispersion of an electrolyte salt (for instance a lithium salt in lithium ion secondary batteries) in a nonaqueous solvent can be typically used as the nonaqueous electrolyte solution. One or two or more types of various organic solvents such as carbonates, ethers, esters, nitriles, sulfones, and lactones can be used, without particular limitations, as the nonaqueous solvent. In concrete terms, for instance a linear or cyclic carbonate such as ethylene carbonate (EC), propylene carbonate (PC), diethyl carbonate (DEC), dimethyl carbonate (DMC) or ethyl methyl carbonate (EMC) can be used herein. For instance a cycle characteristic is more appropriate when the foregoing solvents are fluorinated. As the supporting salt, one or two or more types of salts can be selected and used, from among supporting salts of various types that are used in general nonaqueous electrolyte solution secondary batteries. For instance there is used a lithium salt such as $LiPF_6$, $LiBF_4$, $LiClO_4$, $LiAsF_6$, $Li(CF_3SO_2)_2N$ or $LiCF_3SO_3$. The electrolyte salt can be prepared so that the concentration of the electrolyte salt in the nonaqueous electrolyte solution falls within the range of 0.7 mol/L to 1.3 mol/L.

The film-forming agent is not essential, but can be used in order to stabilize the electrode surface. As the film-forming agent there can be typically used various compounds that are present in the nonaqueous electrolyte solution during production of the battery and that are capable of forming a coating film on the surface of the electrode (negative electrode or positive electrode) by decomposing on the surface of the electrode (typically the negative electrode) during the initial charging step. That is, the film-forming agent does not have an initial form in a secondary battery in secondary battery after initial charging. The decomposition potential of the film-forming agent is not particularly limited, but in one implementation the decomposition potential of the film-forming agent is lower than the decomposition potential of the nonaqueous solvent, such that the film-forming agent decomposes before the nonaqueous solvent does so. Some examples include vinylene carbonate (VC), vinyl ethylene carbonate (VEC), fluoroethylene carbonate (FEC) and oxalato complex compounds. The oxalato complex compound may be a lithium salt of an oxalato complex in which an oxalic acid ion forms coordination bonds with ions of boron (B) and/or phosphorus (P), at the two oxygen atoms of the oxalic acid ion. Specific examples include (oxalato) borates typified for instance by lithium bis(oxalato) borate (LiBOB); fluoro(oxalato) borates typified for instance by lithium difluoro(oxalato) borate; (oxalato) phosphates typified by for instance lithium tris(oxalato) phosphate; and fluoro(oxalato) phosphates typified for instance by lithium difluoro(oxalato) phosphate and lithium tetrafluoro(oxalato) phosphate. Among the foregoing there can be used LiBOB having a potential at the start of formation of the coating film of about 1.5 V to 2 V, referred to lithium. The film-forming agent can be prepared such that the concentration thereof in the nonaqueous electrolyte solution falls within the range of about 0.01 mol/L to 0.1 mol/L. The nonaqueous electrolyte solution can contain various additives such an overcharge inhibitor and a cryoprotectant, besides the film-forming agent.

The battery case is provided with a case body having an opening for insertion of the above multilayer-type electrode body, and with a lid member that seals the opening of the case body. A positive electrode external terminal and a negative electrode external terminal that electrically connect the interior and the exterior of the battery case are provided on the lid member, insulated from the lid member. A filling port for pouring a nonaqueous electrolyte solution is provided in the lid member. The multilayer-type electrode body is superimposed so that a tab of the positive electrode collector protrudes from one edge of the electrode body and a tab of the negative electrode collector protrudes from the other edge of the electrode body. To accommodate the multilayer-type electrode body in the battery case, therefore, firstly the tabs of the positive electrode collector and of the negative electrode collector may be electrically connected to an external positive electrode terminal and an external negative electrode terminal, respectively, that are provided in the lid member. Thereafter, the multilayer-type electrode body integrated with the lid member may be accommodated in the case body, and the case body and the lid member may be sealed for instance by welding. The multilayer-type electrode body is accommodated in the battery case in such a manner that the surfaces of the electrode plates lie in a vertical direction, and tabs are positioned overhead, when the battery case is disposed on a horizontal plane so that the lid member constitutes the top face of the battery case. The nonaqueous electrolyte solution is supplied through the filling port into the battery case, after which the filling port is sealed. A secondary battery can be assembled as a result. Such a secondary battery 10 is charged with power supplied from outside, via the positive electrode external terminal and the negative electrode external terminal. In other words, the secondary battery 10 is charged through connection of the positive electrode external terminal and the negative electrode external terminal to a power supply of higher voltage. The secondary battery 10 supplies power to the exterior, through connection of a load to the positive electrode external terminal and the negative electrode external terminal.

S2. Initial Charging Step

In step S2, the secondary battery 10 after assembly is initially charged, whereupon an SEI film forms on the surface of the negative electrode. Initial charging is a process of charging over the voltage region in which the secondary battery is used. In the initial charging step the secondary battery after assembly is charged up to an operation upper limit potential of the secondary battery (charging stop potential V2, see FIG. 8). As a result, the battery assembly is activated electrochemically and an SEI film becomes formed on the surface of the negative electrode. In the production method disclosed herein the initial charging step can be realized in accordance with the flow illustrated in FIG. 2.

A1. Initial Charging Start

Firstly, initial charging of the secondary battery 10 after assembly is initiated in accordance with an ordinary method. The charging rate for initial charging is not particularly limited. In the art disclosed herein, initial charging can be accomplished suitably through high-rate charging with charging at a high rate. As a result it becomes possible to achieve charging up to the charging stop potential V2 at an overall high speed and in a short time. The term high rate denotes a charging rate higher than a below-described low rate. Typically, the term high rate encompasses a charging rate in excess of 1 C, and for instance refers to a charging current of 1.3 C or greater, 1.5 C or greater, 2 C or greater, and for instance 3 C or greater, particularly 4 C or greater. The high-rate charging current has no upper limit, but, as a guide, is for instance 100 C or smaller (for instance for instance 20 C or smaller). Initial charging is not limited thereto, and can be suitably accomplished in accordance with constant current (CC)-constant voltage (CV) charging.

Figure 8:
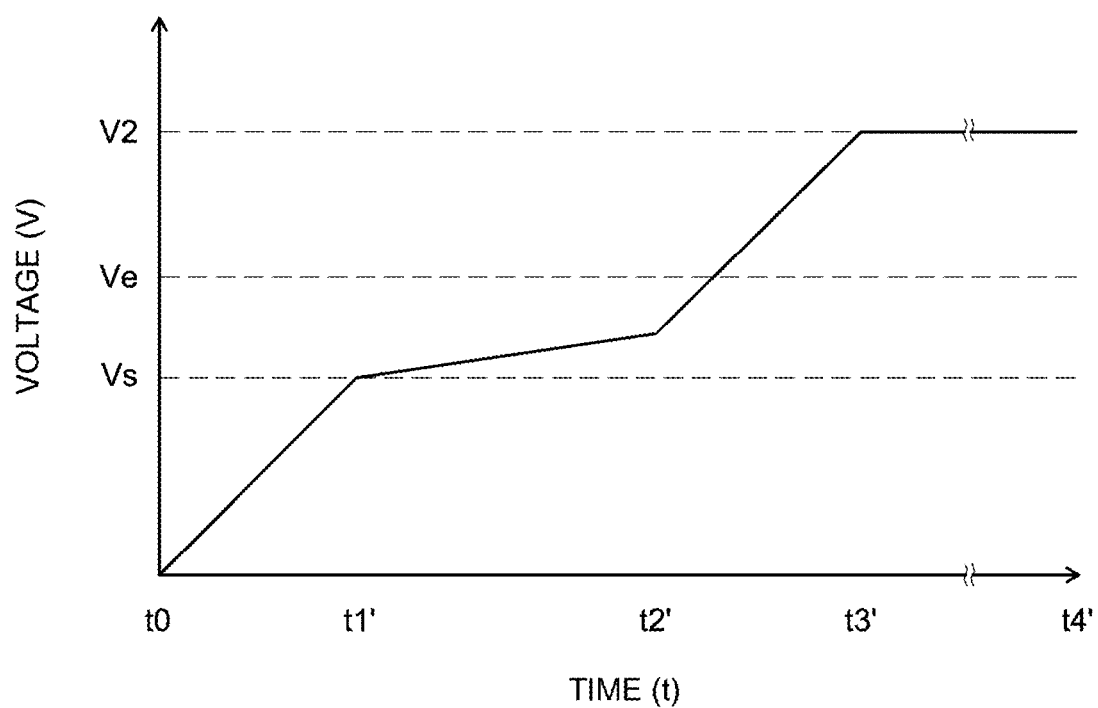
FIG. 8 is a diagram illustrating schematically an example of voltage control in the production of a conventional nonaqueous electrolyte secondary battery.

In initial charging by CC-CV charging of the secondary battery, voltage evolves for instance as illustrated in FIG. 8. Specifically, the terminal voltage of the positive electrode and the negative electrode gradually rises as charging starts, and an SEI film becomes formed on the surface of the negative electrode active material when the battery voltage reaches a coating film formation potential range (Vs to Ve). The SEI film is formed through deposition of decomposition products of for instance the nonaqueous electrolyte solution and/or the film-forming agent. The formation start potential Vs of the SEI film is the decomposition potential of for instance the nonaqueous electrolyte solution and/or the film-forming agent. The negative electrode potential rises gently from time t1' at which formation of the SEI film starts, until time t2' at which formation of the SEI film is complete. In a case of low-rate charging where the charging rate of initial charging is low, lithium ions and a film-forming agent component can slowly and sufficiently penetrate from the exterior (surface) of the negative electrode active material layer up to the interior (collector and vicinity thereof). Accordingly, charging at a low rate allows for instance suitably forming an SEI film having a roughly uniform distribution in the thickness direction of the negative electrode active material layer, up to thin sections of the pores of the negative electrode active material layer. As a result a charge/discharge characteristic of the lithium ions is rendered uniform throughout the negative electrode active material layer, and for instance the internal resistance of the secondary battery can be kept low. Moreover, the input/output characteristic in the lithium ions can be increased. However, the charging time up to the charging upper limit potential takes a very long time in low-rate charging. The term low rate denotes herein charging typically at a charging rate of about 1 C or less. Initial charging is generally carried out at a current of about 0.01 to 1 C, typically about 0.1 to 0.5 C (in practice about 0.5 C).

In the case of high-rate initial charging at a high charging rate, by contrast, the time until the negative electrode potential reaches the formation start potential Vs of the SEI film is short. In high-rate charging, large amounts of for instance lithium ions move towards the negative electrode in a short time. The higher the charging rate, the higher is the forming rate of the coating film on the surface of the negative electrode active material. As a result, large amounts of for instance lithium ions and coating film forming component having reached the surface of the negative electrode active material layer decompose on the surface of the negative electrode active material in the order of arrival of the components, and the SEI film becomes formed as a result. The pores of negative electrode active material layers having a porous structure are formed randomly, and accordingly the SEI film is formed readily in some sites and not readily in others, depending on the paths for movement of for instance the lithium ions. That is, the manner in which the coating film is formed on the negative electrode active material layer may exhibit unevenness for instance depending on the form of the pores and on the position in the thickness direction of the SEI film.

In the production method disclosed herein, therefore, initial charging is carried out at a high rate up to any first potential V1 within a voltage range for forming the coating film (Vs to Ve), and the potential is maintained at the first potential V1 in such a manner that the SEI film can be formed uniformly and sufficiently on the negative electrode active material layer. In other words, constant voltage (CV) charging is performed at the first potential V1 until the SEI film is formed uniformly and sufficiently on the negative electrode active material layer. The voltage range for forming the coating film and the coating film formation start voltage Vs of the above-described SEI film can be ascertained for example through measurement of the decomposition potential of for instance the nonaqueous electrolyte solution and/or the film-forming agent. For instance a value reported in the literature may be used as the coating film formation start voltage Vs. The coating film formation start voltage Vs can be grasped beforehand on the basis of for instance a peak voltage in a voltage-differential capacity curve, or an inflection point voltage in a time-voltage curve, at the time of CC charging at a low rate (for instance 0.1 C) of a secondary battery having the same configuration as that of the secondary battery to be produced. Any voltage (for instance the coating film formation start voltage Vs or an intermediate voltage (for instance={Vs+Ve}/2)) within the voltage range for forming the coating (Vs to Ve) may be used as the first potential V1.

The duration of CV charging at the first potential V1 is set so as to enable on-site checking of formation state of the SEI film formed in the secondary battery 10, and determining that the SEI film has formed sufficiently on the negative electrode active material layer. Findings by the inventors have revealed that the more densely the SEI film is formed uniformly and sufficiently, the smaller is the amount of electrolyte ions that can pass through the SEI film, and the lower becomes the ionic conductivity of the SEI film. Whether the SEI film is formed sufficiently or not can be determined through checking of whether the ionic conductivity of the SEI film has dropped or not to or below a predetermined value. Taking herein the time of CV charging at the first potential V1 as a voltage holding time, the voltage holding time and the ionic conductivity of the SEI film exhibit for instance the relationship illustrated in FIG. 9. At the beginning of CV charging, a longer voltage holding time entails a drop in ionic conductivity of the SEI film. Once CV charging has progressed for a given duration, however, the drop in the ionic conductivity of the SEI film levels off, and approaches a constant value. Therefore, the time at which the ionic conductivity can be deemed for the first time to have reached substantially a predetermined saturation value (first ionic conductivity σ1) can be taken herein as the time of termination of CV charging at the first potential V1. Whether the ionic conductivity has substantially leveled off or not can be determined for instance on the basis of whether a proportion of the decrease in ionic conductivity per unit voltage holding time (minutes) takes on or not a predetermined threshold value (for instance $-1 \times 10^{-9}$ S/(cm·min) or less), in a relationship between the voltage holding time and the ionic conductivity of the SEI film. For instance the ionic conductivity at which the proportion of decrease in ionic conductivity is the above threshold value, or the ionic conductivity at the voltage holding time closest to the threshold value, can be taken herein as the first ionic conductivity σ1.

A2. Measurement of AC Impedance

The ionic conductivity of the SEI film can be measured on-site and non-destructively by resorting to an AC impedance method. Therefore, one embodiment of the art disclosed herein involves measuring the ionic conductivity of the SEI film in accordance with an AC impedance method.

In an AC impedance measurement, for instance DC current is caused to flow across the external positive and negative electrode terminals, and next there is measured a response voltage, at each frequency, at the time of superposition of a small AC current while frequency is modified. Impedance can be obtained as a result. Specifically, a frequency characteristic of impedance can be worked out by applying a Fourier transform to the obtained data. The frequency of AC voltage may be set to vary from a high frequency of about 100 kHz to a low frequency of about 0.1 Hz. The amplitude of AC voltage is not particularly limited, but can be set to about 1 to 10 mV, and for instance to about 5 mV as a guide.

Figure 9:
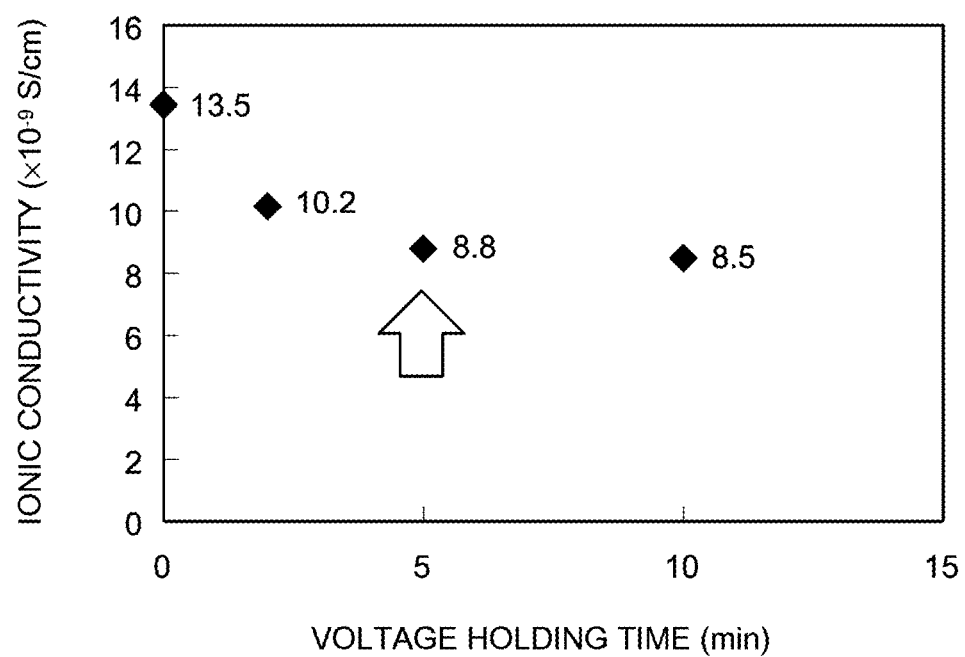
FIG. 9 is a graph illustrating a relationship between voltage holding time and ionic conductivity of an SEI film in an initial charging step in an example.

The time until the first AC impedance measurement is performed, after start of CV charging at the first potential V1, can for instance be set to a voltage holding time T1 at the time of reaching of the first potential V1 at which the ionic conductivity can be deemed to be substantially saturated, in the relationship between voltage holding time and ionic conductivity of the SEI film illustrated in FIG. 9. Whether the ionic conductivity has become substantially saturated or not can be determined for instance on the basis of whether a proportion of the decrease in ionic conductivity per unit voltage holding time (minutes) takes on or not a predetermined threshold value (for instance $-1 \times 10^{-9}$ S/(cm·min) or less, or for instance $-0.5 \times 10^{-9}$ S/(cm·min) or less), in a relationship between the voltage holding time and the ionic conductivity of the SEI film.

A3. Calculation of Ionic Conductivity of SEI Film

Figure 5:
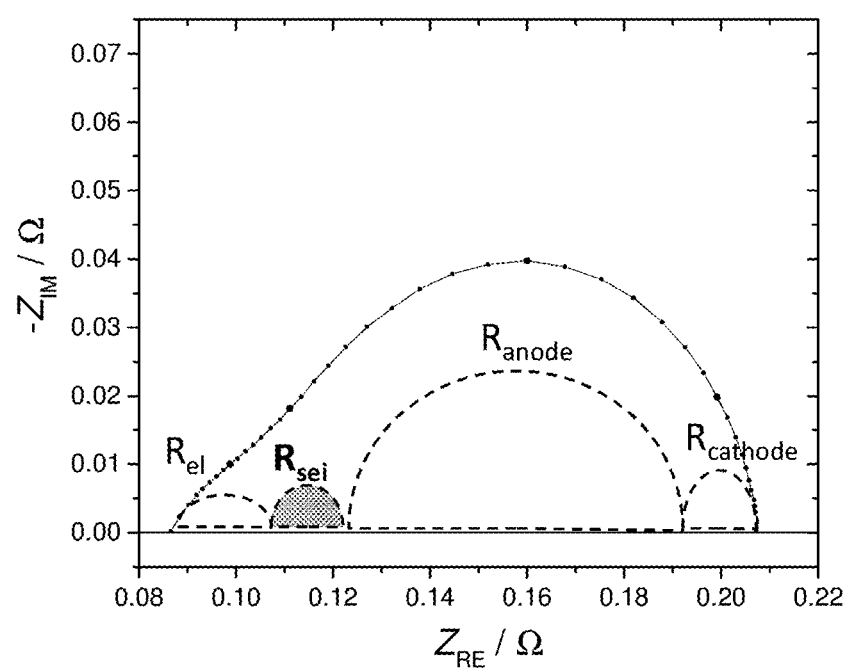
FIG. 5 is a diagram illustrating an example of a Nyquist plot based on an AC impedance measurement of a secondary battery.

For example a relationship such as that in the complex impedance plot (Nyquist plot) illustrated in FIG. 5 can then be obtained for instance upon plotting of a real component $Z_{RE}$ on the horizontal axis and of an imaginary component Z on the vertical axis, on the basis of a measurement frequency obtained by AC impedance measurement and data about real part and an imaginary part of impedance at that frequency. As can be seen in FIG. 5 resistance values can be separated by frequency in the real component. For instance $R_{el}$ in FIG. 5 represents the resistance of the nonaqueous electrolyte solution, $R_{sei}$ represents SEI resistance, $R_{anode}$ represents negative electrode resistance and $R_{Cathode}$ represents positive electrode resistance. The resistance values of these portions correspond to the diameter (maximum width) of the plots of semicircular shape. The SEI resistance value $R_{sei}$ can be calculated easily on the basis of the results of the AC impedance measurement, by working out beforehand a frequency region at which the SEI resistance component is to be measured, in a secondary battery having the configuration that is produced. The SEI electrostatic capacitance $C_{sei}$ can be calculated through fitting and analysis of the plots of the SEI resistance component.

A relationship given by the expression below is found between the SEI resistance value $R_{sei}$, the SEI electrostatic capacitance $C_{sei}$ and the ionic conductivity $\sigma_C$ of the SEI film. Therefore, the ionic conductivity $\sigma_C$ of the SEI film at the time of initial charging can be calculated from the SEI resistance value $R_{sei}$ and the SEI electrostatic capacitance $C_{sei}$, on the basis of the expression below.

$$\sigma_C = \frac{\varepsilon_0 \times \varepsilon}{R_{sei} \times C_{sei}}$$

In the expression, $\varepsilon_0$ is the permittivity of vacuum ($8.9\times 10^{-14}$ F/cm), and $\varepsilon$ is relative permittivity (10; literature value) of the SEI film. Methods for calculating the resistance ($R_{sei}$) of the SEI film, the electrostatic capacitance ($C_{sei}$) and the ionic conductivity ($\sigma_C$) of the SEI film by AC impedance measurement are known, and a further detailed explanation thereof will be omitted herein.

A4. Determination

As pointed out above, it is determined next whether or not the ionic conductivity $\sigma_C$ of the SEI film calculated by AC impedance measurement has reached a first ionic conductivity $\sigma 1$, which can be deemed to be a predetermined saturation ionic conductivity. In other words, it is determined whether "$\sigma_C \leq \sigma 1$" is satisfied or not.

In a case where "$\sigma_C \leq \sigma 1$" is not satisfied (in a case where $\sigma_C > \sigma 1$), it is deemed that the ionic conductivity $\sigma_C$ of the SEI film has not dropped sufficiently yet, and that the SEI film cannot be regarded as having been formed sufficiently on the surface of the negative electrode active material layer; CV charging at the first potential V1 can thus be continued. Thereupon, an AC impedance measurement step (A2), a step (A3) of calculating the ionic conductivity of the SEI film and a determination step (A4) can be carried out once more. Steps (A2) through (A4) can be executed repeatedly until "$\sigma_C \leq \sigma 1$" is satisfied. For instance the above-described voltage holding time T1 may be used as a repetition time (interval) until AC impedance is measured again. Alternatively, the shortest time until termination of the determination as to whether "$\sigma_C \leq \sigma 1$" is satisfied, on the basis of the AC impedance measurement, or an arbitrary time equal to or longer than this shortest time, can be used as the repetition time (interval).

A5. Termination of CV Charging

In a case on the other hand where "$\sigma_C \leq \sigma 1$" is satisfied, it is deemed that the ionic conductivity $\sigma_C$ of the SEI film has become sufficiently low and the SEI film has sufficiently formed on the surface of the negative electrode active material layer, and thus CV charging at the first potential V1 can be terminated. Accordingly, CV charging at the first potential V1 can be terminated at the shortest time in which "$\sigma_C \leq \sigma 1$" is first satisfied in the initial charging step.

A6. Termination of Initial Charging

After the SEI film has sufficiently formed on the surface of the negative electrode active material layer, charging up to the charging stop potential V2 is subsequently realized through CC charging at a high rate. To complete initial charging, charging can be discontinued for instance through attenuation until current takes on a constant ratio (for instance 0.1 C) in CV charging at the charging stop potential V2, or through CC charging for a predetermined time (for instance 10 minutes). The step of initial charging can be properly terminated in a short time as a result.

S3. High-Temperature Aging Step

Figure 6:
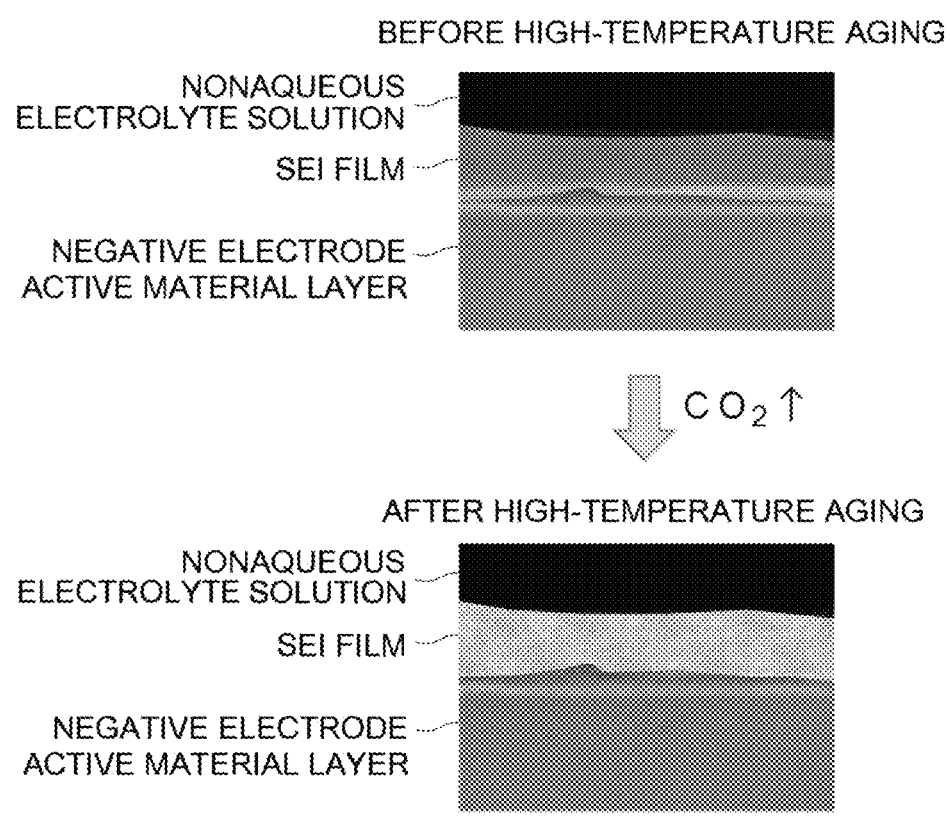
FIG. 6 is a diagram for explaining changes in an SEI film derived from high-temperature aging of a secondary battery.
Figure 7:
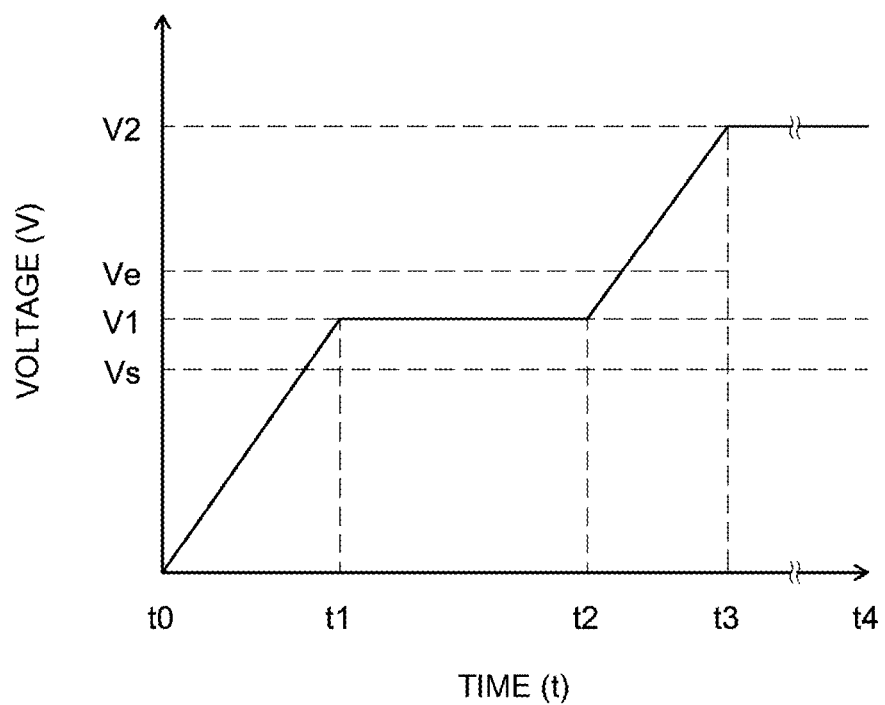
FIG. 7 is a diagram illustrating schematically an example of voltage control in the production of a nonaqueous electrolyte secondary battery according to an embodiment.

In step S3 the secondary battery 10 after the initial charging is aged at high temperature, to modify the SEI film formed on the negative electrode surface. High-temperature aging is a process of keeping the secondary battery in a high-temperature environment while maintaining the state of charge. Herein, the secondary battery after initial charging is held in a high-temperature environment at the charging stop potential V2. Excess components in the SEI film formed on the negative electrode surface are oxidatively decomposed as a result to $CO_2$ or the like, for instance as illustrated in FIG. 6. In the case for instance where the negative electrode active material of the lithium ion secondary battery is a carbon-based material, the electrolyte solution component decomposes readily at or above a predetermined potential, on account of the high reactivity of the carbon-based material. Accordingly, in secondary batteries in particular where a carbon-based material is used in the negative electrode, a compound (film-forming agent) that forms a coating film through reductive decomposition at the time of charging is added to the nonaqueous electrolyte solution for the purpose of forming a better coating film (see for instance Japanese Patent Application Publication No. 2010-287512). Modification the SEI film formed on the basis of a film-forming agent can be suitably accomplished through holding in a high-temperature environment while staying at the above charging stop potential V2. Battery characteristics typified for instance by a charge-discharge cycle characteristic at a high temperature and a high rate are improved as a result. In the production method disclosed herein the high-temperature aging step can be realized in accordance with the flow illustrated in FIG. 3.

B1. Start of High-Temperature Aging

Firstly, the secondary battery 10 after initial charging is placed in a high-temperature environment in accordance with an ordinary method, and high-temperature aging is initiated. The aging temperature in high-temperature aging is not particularly limited. The aging temperature depends for instance on the composition of the SEI film formed at initial charging, and cannot be prescribed categorically. As an example, the aging temperature can be set to be 30° C. or higher, or 40° C. or higher, and for instance 50° C. or higher, and further to 60° C. or higher. The upper limit of the aging temperature is not particularly restricted, but, as a guide, can be set for instance to about 80° C. or lower. For instance a thermostatic bath may be used for managing the aging temperature.

In order to shorten the duration of high-temperature aging to the minimum necessary, while sufficiently enhancing the battery characteristics of the secondary battery, high-temperature aging may be completed at the same time that modification of the SEI film has progressed sufficiently. Findings by the inventors have revealed that whether the SEI film has been modified sufficiently or not can be checked on the basis of whether the ionic conductivity of the SEI film has increased or not to or above a predetermined value. For instance the relationship illustrated in FIG. 10 can be observed between a high-temperature aging time and the ionic conductivity of the SEI film. At the beginning of the high-temperature aging start the ionic conductivity of the SEI film rises as the high-temperature aging time increases, but once high-temperature aging has lasted for a given time, the increase in the ionic conductivity of the SEI film levels off, and ionic conductivity approaches a constant value. Therefore, the point in time at which the ionic conductivity can be deemed to have substantially reached for the first time a predetermined saturation value (second ionic conductivity $\sigma 2$) can be taken herein as the time of completion of high-temperature aging. Whether or not the ionic conductivity has substantially leveled off can be determined for instance on the basis of whether or not the proportion of increase in ionic conductivity per unit high-temperature aging time (hours) in a relationship between high-temperature aging time and ionic conductivity of the SEI film has reached a predetermined threshold value (for instance $0.1 \times 10^{-9}$ S/(cm·h) or less). For instance the ionic conductivity at which the proportion of decrease in ionic conductivity is the above threshold value, or the ionic conductivity at the aging time closest to the threshold value, can be taken herein as the second ionic conductivity $\sigma 2$.

B2. Measurement of AC Impedance

The ionic conductivity of the SEI film during high-temperature aging can be measured on-site and non-destructively by resorting to an AC impedance method. Therefore, one embodiment of the art disclosed herein involves measuring the ionic conductivity of the SEI film in accordance with an AC impedance method. The measurement of AC impedance is similar to that explained above concerning the initial charging step, and will not be expounded again. As a result, a resistance value $R_{age}$ and an SEI electrostatic capacitance $C_{age}$ of the SEI film during high-temperature aging can be obtained by AC impedance measurement.

The time elapsed since initiation of high-temperature aging until the first AC impedance measurement is performed is not particularly limited. For instance, in the relationship between high-temperature aging time and ionic conductivity of the SEI film illustrated in FIG. 10 there can be set a high-temperature aging time T2 at a time where the second ionic conductivity σ2 is reached where ionic conductivity can be deemed to have substantially leveled off.

B3. Calculation of Ionic Conductivity of SEI Film

Next, an ionic conductivity $\sigma_A$ of the SEI film at the time of high-temperature aging can be calculated, on the basis of the expression below, using the SEI resistance value $R_{age}$ and SEI electrostatic capacitance $C_{age}$ obtained by AC impedance measurement. In the expression, $\varepsilon_0$ is the permittivity of vacuum ($8.9\times10^{-14}$ F/cm), and $\varepsilon$ is relative permittivity (10; literature value) of the SEI film.

$$\sigma_A = \frac{\varepsilon_0 \times \varepsilon}{R_{age} \times C_{age}}$$

B4. Determination

Next, it is determined whether the ionic conductivity $\sigma_A$ of the SEI film at the time of high-temperature aging, calculated on the basis of an AC impedance measurement, has reached or not a second ionic conductivity σ2 being a predetermined saturation ionic conductivity. In other words, it is determined whether "$\sigma_A \geq \sigma2$" is satisfied or not. In a case where "$\sigma_A \geq \sigma2$" is not satisfied (in a case where $\sigma_A < \sigma2$), it is deemed that the ionic conductivity $\sigma_A$ of the SEI film has not yet increased sufficiently and that modification of the SEI film cannot be regarded as having been sufficiently carried out; accordingly, high-temperature aging can be continued. Then an AC impedance measurement step (B2), a step (B3) of calculating the ionic conductivity of the SEI film and a determination step (B4) can be carried out once more. Steps (B2) through (B4) can be executed repeatedly until "$\sigma_A \geq \sigma2$" is satisfied. For instance the above-described high-temperature aging time T2 may be used as a repetition time (interval) until AC impedance is measured again. Alternatively, the shortest time until termination of the determination as to whether "$\sigma_A \geq \sigma2$" is satisfied, on the basis of the AC impedance measurement, or an arbitrary time equal to or longer than this shortest time, can be used as the repetition time (interval).

B5. Termination of High-Temperature Aging

In a case on the other hand where "$\sigma_A \geq \sigma2$" is satisfied, it is deemed that the ionic conductivity $\sigma_A$ of the SEI film has become sufficiently high and the SEI film has been sufficiently modified, and thus the high-temperature aging step can be properly terminated.

In the above production method, the following sub-steps S21, S22 can be carried out in both S2: initial charging step and S3: high-temperature aging step.

(S21) Step of, at a predetermined potential, performing AC impedance measurement on the secondary battery 10 while maintaining that potential, and calculating the ionic conductivity of the SEI film formed on the surface of the negative electrode of the secondary battery 10, on the basis of the AC impedance measurement; and (S22) step of determining whether the calculated ionic conductivity falls within a predetermined range or not; and maintaining the potential when the calculated ionic conductivity does not fall within the predetermined range, and terminating the maintaining of the potential when the calculated ionic conductivity falls within the predetermined range.

Through execution of these sub-steps it becomes possible to check on-site that S2: initial charging step and of S3: high-temperature aging step are complete, sufficiently and in a shortest time, using the ionic conductivity of the SEI film as an indicator. The initial charging step and the high-temperature aging step are ordinarily processes performed all at a time on a plurality of secondary batteries 10. The art disclosed herein allows optimally managing the charging voltage and the high-temperature aging time of the individual batteries, independently from each other. As a result, an initial charging step and a high-temperature aging step suitable for coping with battery production variability can be performed in the minimum necessary time. This is not limited to one secondary battery, and it is possible to suppress formation unevenness of the SEI film within a secondary battery group, and to stably produce a secondary battery of superior battery characteristics, typified by a high-temperature, high-rate cycle characteristic.

Figure 4:
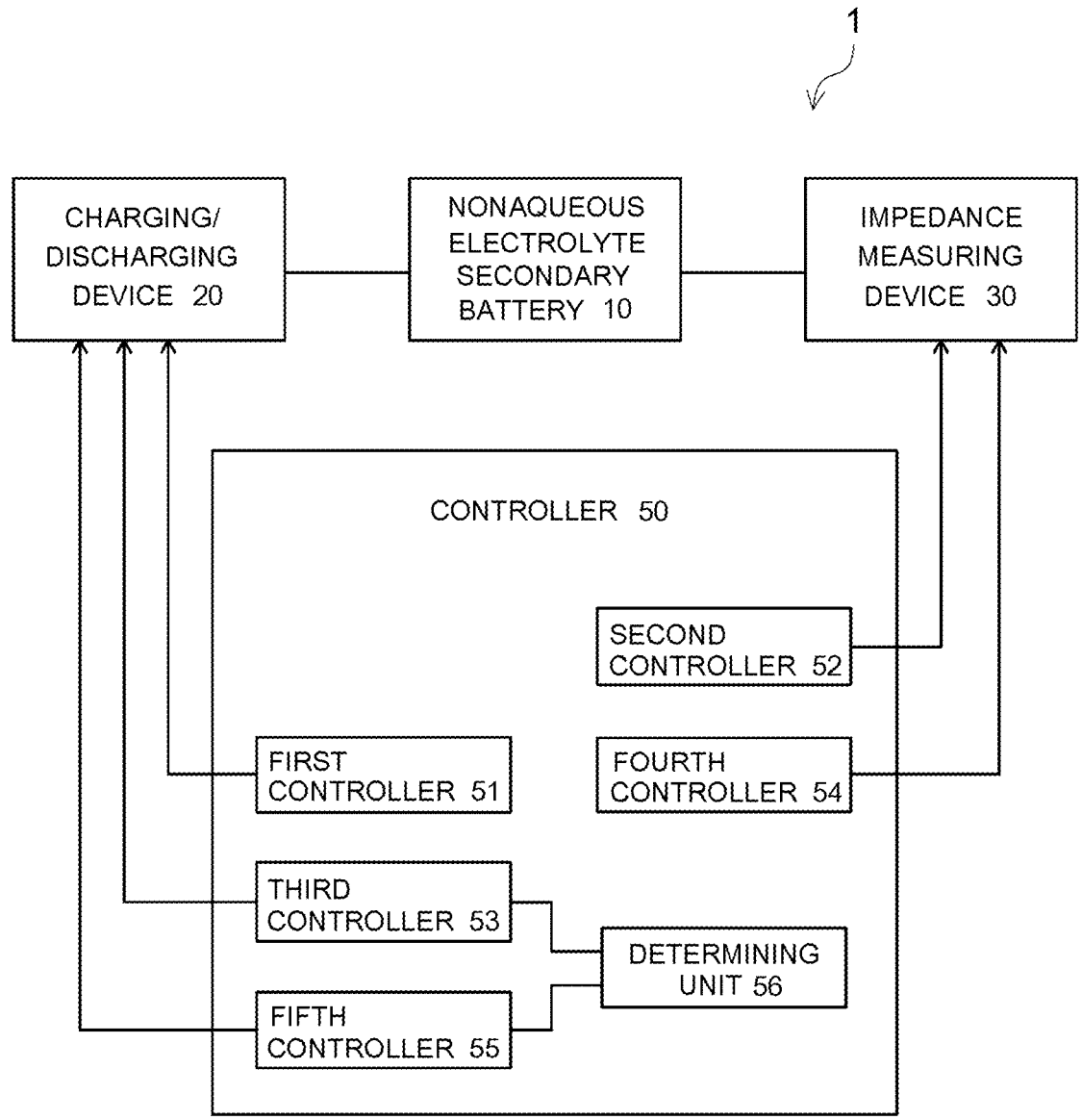
FIG. 4 is a block diagram illustrating the configuration of a system for producing a nonaqueous electrolyte secondary battery according to an embodiment.

The above method for producing a secondary battery can be suitably implemented by utilizing for instance a production system 1 disclosed herein in S2: initial charging step and S3: high-temperature aging step. FIG. 4 is a block diagram illustrating the configuration of a production system 1 of the nonaqueous electrolyte secondary battery 10 according to the present embodiment. The production system 1 is a system for producing the nonaqueous electrolyte secondary battery 10. Although not limited thereto, the production system 1 disclosed herein is provided with a charging/discharging device 20, an impedance measuring device 30 and a controller 50. The production system 1 may be provided with a thermostat, not shown, as the case may require.

The charging/discharging device 20 is a device capable of charging the secondary battery 10 and discharging the secondary battery 10. A charging/discharging device of such kind of secondary batteries can be used, without particular limitations, as the charging/discharging device 20. For instance, the charging/discharging device 20 may be provided with a DC power source, an electronic load, a voltage meter, a current meter and a connection part, and is configured to be capable of outputting power to the secondary battery 10 and to consume power from the secondary battery 10. The connection part is for instance a constituent member that electrically connects the positive electrode and the negative electrode of a DC power source to the positive electrode external terminal and the negative electrode external terminal of the secondary battery 10, respectively. The connection part may be configured for instance so that a charging process and a discharge process can be carried out all at a time on a plurality of secondary batteries 10. The charging/discharging device 20 is connected to the controller 50. For instance the operation of the charging/discharging device 20 is controlled by the controller 50.

The impedance measuring device 30 is a device that allows performing an AC impedance measurement on the secondary battery 10. Various types of electrochemical measuring devices allowing for AC impedance measurement in secondary batteries of this kind can be used herein, without particular limitations, as the impedance measuring device 30. The impedance measuring device 30 is provided for instance with a frequency response analyzer, a potentiostat or a galvanostat, and analysis software, and is configured to be capable of performing an electrochemical impedance measurement on the secondary battery 10, and analyzing the obtained data. The impedance measuring device 30 is electrically connected to the secondary battery 10 and the controller 50. For instance the operation of the impedance measuring device 30 is controlled by the controller 50.

The configuration of the controller 50 is not particularly limited, and may be realized relying on structures and functions that are known or that may yet be developed. The controller 50 is for instance a microcomputer. The hardware configuration of the microcomputer is not particularly limited, and for instance the microcomputer may be provided with an interface (I/F) for exchanging information such as print data with an external device such as a host computer, a central processing unit (CPU) that executes commands of a control program, a read-only memory (ROM) that stores a program to be executed by the CPU, a random-access memory (RAM) used as a working area in which the program is to be deployed, and a storage device such as a memory, having stored therein the above program, print data and various kinds of other data. Alternatively, the controller 50 may be configured for instance in the form of a rewritable programmable logic device such as a field-programmable gate array (FPGA). This FPGA may have for instance a CPU core, a multiplier and a RAM, made up of integrated circuits, as well as peripheral circuits pertaining to the foregoing.

The microcomputer is provided with for instance a display unit and an input unit, not shown. The user can input for instance various instructions to the controller 50 through the input unit. The display unit can display for instance the state of the production system 1, as well as information relating to initial charging and high-temperature aging. The controller 50 need not necessarily be connected physically to the charging/discharging device 20 or the impedance measuring device 30, and may be for instance a computer that is communicably connected to the charging/discharging device 20, the impedance measuring device 30 and so forth, wirelessly or via wires.

As illustrated in FIG. 4, the controller 50 is provided with a first controller 51, a second controller 52, a third controller 53 and a determining unit 56. The controller 50 is additionally provided with a fourth controller 54 and a fifth controller 55. The controller 50 of the present embodiment is electrically connected to the charging/discharging device 20 and the impedance measuring device 30, and controls comprehensively the operation of the entire production system 1. The various units in the controller 50 such as the first controller 51, second controller 52, third controller 53, fourth controller 54 and fifth controller 55, as well as the determining unit 56 may all be configured out of hardware (for instance circuits) independently from each other; alternatively, a configuration may be adopted in which the foregoing are functionally realized through execution of a computer program by the CPU. The controller 50 can receive from a host computer or the like, via an interface, information about the secondary battery 10, and for instance an initial charging condition thereof, and may output for example measurement and analysis results by the impedance measuring device 30. Initial charging conditions such as the charging rate, first potential V1, voltage holding time T1 and charging stop potential V2 in the initial charging step; the first ionic conductivity σ1; high-temperature aging conditions such as the high-temperature aging time T2 in the high-temperature aging step; as well as the second ionic conductivity σ2, can be stored beforehand by an operator in the storage device, via the input unit.

The first controller 51 controls the charging/discharging device 20 so as to perform initial charging on the secondary battery 10, to form an SEI film on the surface of the negative electrode. The first controller 51 for instance prompts the charging/discharging device 20 to start high-rate initial charging of the secondary battery 10, in an initial charging start step A1 of the above initial charging step. The first controller 51 controls the charging/discharging device 20 so that, when the negative electrode potential reaches the first potential V1, CV charging is performed for the voltage holding time T1 at the first potential V1.

After execution of CV charging by the first controller 51 for the voltage holding time T1, the second controller 52 controls the charging/discharging device 20 and the impedance measuring device 30 so as to perform AC impedance measurement on the secondary battery 10, while maintaining the first potential V1. Specifically, the second controller 52 causes the charging/discharging device 20 to perform CV charging at the first potential V1, in the measurement step A2 of AC impedance. Simultaneously therewith, the second controller 52 prompts the impedance measuring device 30 to perform AC impedance measurement of the secondary battery 10. The second controller 52 calculates the SEI resistance value $R_{sei}$ and the SEI electrostatic capacitance $C_{sei}$ on the basis of the result of the impedance measurement. The calculation results of the SEI resistance value $R_{sei}$ and of the SEI electrostatic capacitance $C_{sei}$ are for instance forwarded to the determining unit 56.

In the subsequent calculation step A3 of the ionic conductivity of the SEI film, the determining unit 56 for instance calculates the ionic conductivity $\sigma_C$ of the SEI film at the time of initial charging, on the basis of the SEI resistance value $R_{sei}$ and the SEI electrostatic capacitance $C_{sei}$ received from the second controller 52. The determining unit 56 determines whether the calculated ionic conductivity $\sigma_C$ falls within a predetermined range or not. Specifically, for instance, the determining unit 56 determines whether or not the ionic conductivity $\sigma_C$ satisfies "$\sigma_C \le \sigma 1$" with respect to the first ionic conductivity σ1 set beforehand. The determination result by the determining unit 56 is forwarded for instance to the third controller 53.

In the determination step A4, the third controller 53 controls the charging/discharging device 20 so as to maintain the first potential V1 when the determining unit 56 determines that the ionic does not fall within a predetermined range. Specifically, the third controller 53 controls the charging/discharging device 20 so as to continue CV charging at the first potential V1, when the determining unit 56 determines that the ionic conductivity $\sigma_C$ does not satisfy "$\sigma_C \le \sigma 1$" with respect to the first ionic conductivity σ1. Then the third controller 53 for instance instructs the second controller 52 to perform the AC impedance measurement once more.

When on the other hand the determining unit 56 determines that the ionic conductivity falls within a predetermined range the third controller 53 controls the charging/discharging device 20 so as to terminate the maintaining of the first potential V1. Specifically, the third controller 53 proceeds to the CV charging termination step A5, and terminates CV charging at the first potential V1 when the determining unit 56 determines that the ionic conductivity $\sigma_C$ satisfies "$\sigma_C \leq \sigma 1$" with respect to the first ionic conductivity $\sigma 1$. For instance, the controller 50 proceeds to the initial charging termination step A6, and subsequently controls the charging/discharging device 20 so as to perform charging up to the charging stop potential V2 through CC charging at a high rate, followed by CC charging until current is attenuated down to a constant proportion (for instance 0.1 C). As a result it becomes possible to execute properly the predetermined initial charging step S2 in the minimum required time.

The fourth controller 54 controls the charging/discharging device 20 and the impedance measuring device 30 so as to perform AC impedance measurement on the secondary battery 10 in a predetermined temperature environment, while the second potential V2 is maintained. Specifically, the fourth controller 54 controls for instance the charging/discharging device 20 so that the initial state of charge of the secondary battery 10 is maintained, in a high-temperature aging start step B1 in the high-temperature aging step. The fourth controller 54 for instance controls the impedance measuring device 30 so that AC impedance measurement is performed on the secondary battery 10, when the aging time of high-temperature aging reaches a predetermined high-temperature aging time T2 in the AC impedance measurement step B2. The fourth controller 54 calculates the SEI resistance value $R_{sei}$ and the SEI electrostatic capacitance $C_{sei}$ on the basis of the result of impedance measurement by the impedance measuring device 30. The calculation results of the SEI resistance value $R_{sei}$ and of the SEI electrostatic capacitance $C_{sei}$ are for instance forwarded to the determining unit 56.

In a subsequent calculation step B3 of the ionic conductivity of the SEI film, the determining unit 56 for instance calculates the ionic conductivity $\sigma_A$ of the SEI film at the time of high-temperature aging, on the basis of the SEI resistance value $R_{sei}$ and the SEI electrostatic capacitance $C_{sei}$ received from the second controller 52. The determining unit 56 determines whether the calculated ionic conductivity $\sigma_A$ falls within a predetermined range or not. Specifically, for instance, the determining unit 56 determines whether or not the ionic conductivity $\sigma_A$ satisfies "$\sigma_A \geq \sigma 2$" with respect to the second ionic conductivity $\sigma 2$ set beforehand. The determination result by the determining unit 56 is forwarded for instance to the fifth controller 55.

The fifth controller 55 controls the charging/discharging device 20 so as to continue the second potential V2 when the determining unit 56 determines that the ionic conductivity $\sigma_A$ does not fall within a predetermined range. Specifically, the fifth controller 55 controls the charging/discharging device 20 so as to continue high-temperature aging by maintaining the second potential V2 when the determining unit 56 determines that the ionic conductivity $\sigma_A$ does not satisfy "$\sigma_A \geq \sigma 2$" with respect to the second ionic conductivity $\sigma 2$. Then the fifth controller 55 for instance instructs the fourth controller 54 to perform the AC impedance measurement once more.

When on the other hand the determining unit 56 determines that the ionic conductivity GA falls within a predetermined range, the fifth controller 55 controls the charging/discharging device 20 so as to maintain the second potential V2. Specifically, the fifth controller 55 proceeds to the high-temperature aging termination step B5, and terminates high-temperature aging in which the second potential V2 is maintained in the high-temperature environment, when the determining unit 56 determines that the ionic conductivity $\sigma_A$ satisfies "$\sigma_A \geq \sigma 2$" with respect to the second ionic conductivity $\sigma 2$. As a result it becomes possible to execute properly the predetermined high-temperature aging step S3 in the minimum required time.

Such a configuration allows checking immediately and directly, on-site, the formation status of the SEI film in the initial charging step and the modification status of the SEI film in the high-temperature aging step, using the ionic conductivity of the SEI film as an indicator. As a result it becomes possible to keep the CV charging time for forming the SEI film in the initial charging step, and the modification time of the SEI film in the high-temperature aging step, to the minimum necessary, and to properly minimize the time required for producing the secondary battery. Also, the ionic conductivity of the SEI film can be measured more conveniently and in a short time, by relying on the AC impedance method. In consequence, the formation status and the modification status of the SEI film can be monitored in real time, and the production time can be minimized, while preserving high battery characteristics of the secondary battery.

In the method for producing a secondary battery of the present embodiment, process time based on the ionic conductivity of an SEI film is shortened in both the initial charging step and the high-temperature aging step. However, the method for producing a secondary battery disclosed herein is not limited thereto. Shortening of the process time based on the ionic conductivity of an SEI film may be realized in just either one from among the initial charging step and the high-temperature aging step. The production time of the secondary battery can be shortened thereby as well. In the production system of a secondary battery of the present embodiment, similarly, the controller 50 is provided with the first controller 51 through the third controller 53 pertaining to the initial charging step, and also with the fourth controller 54 and the fifth controller 55 pertaining to the high-temperature aging step. However, the production system of a secondary battery disclosed herein is not limited thereto. The controller 50 may be provided with only one of the first controller 51 through third controller 53 pertaining to the initial charging step, and the fourth controller 54 and the fifth controller 55 pertaining to the high-temperature aging step. A production system can be realized as a result that allows producing a secondary battery while shortening production time.

In the concrete examples below nonaqueous electrolyte secondary batteries were produced in accordance with the production method disclosed herein. The present art is however not meant to be limited to the features illustrated in these concrete examples.

Embodiment 1. Minimization of Initial Charging Step

Herein natural graphite (C) as a negative electrode active material powder, styrene-butadiene rubber (SBR) as a binder, and carboxymethyl cellulose (CMC) as a thickener were kneaded with deionized water, at a mass ratio of C:SBR:CMC=98:1:1, to prepare a negative electrode paste. The paste was applied onto both faces of a copper foil, as a negative electrode collector, with drying and pressing, to thereby form a negative electrode active material layer about 110 μm thick, and yield a negative electrode.

Also, $LiNi_{1/3}Mn_{1/3}Co_{1/3}O_2$ (LNMC) as a positive electrode active material powder, acetylene black (AB) as a conductive material, and PVDF as a binder, were mixed with N-methyl pyrrolidone (NMP) at a mass ratio of LNMC:AB: PVDF=90:8:2, to prepare a positive electrode paste. The paste was applied onto both faces of an aluminum foil, as a positive electrode collector, with drying and pressing, to thereby form a positive electrode active material layer, and yield a positive electrode.

Construction of Lithium Ion Battery

The prepared negative electrode and positive electrode were superimposed on each other across an interposed separator, and the resulting stack was accommodated in a battery case together with an electrolyte solution, to produce a nonaqueous electrolyte secondary battery. A micro-porous sheet 20 μm thick made up of polyethylene (PE) and polypropylene (PP), and having a three-layer structure of PP/PE/PP, was used as the separator. As the nonaqueous electrolyte solution there was used an electrolyte solution resulting from dissolving $LiPF_6$ as a supporting salt, to a concentration of 1.0 M, and LiBOB as a film-forming agent, to a concentration of 0.05 M, in a mixed solvent containing ethylene carbonate (EC), ethyl methyl carbonate (EMC) and dimethyl carbonate (DMC) at a volume ratio of EC:EMC: DMC=3:3:4. The aluminum foil as the positive electrode collector and the copper foil as the negative electrode collector were electrically connected to an external positive electrode terminal and an external negative electrode terminal of the battery case, respectively, via collector members. A lithium secondary battery for evaluation was prepared as a result.

Initial Charging and Measurement of Ionic Conductivity of SEI Film

The voltage range for forming the coating film of the lithium ion battery for evaluation of this specification was measured first. The coating film formation start voltage was about 1.7 V and the voltage range for forming the coating film was about 1.7 to 2.0 V. The first voltage to be held in order to form the SEI film in the initial charging step was thus set to 1.8 V. Initial charging of the lithium ion battery for evaluation was carried out then in an environment at 25° C., under the following conditions. The holding time (SEI film formation time) at the first voltage was set to vary in four ways between 0 to 10 minutes, as given in Table 1.

Initial Charging Conditions

Voltage raise section 1: CC charging at a charging rate of 5 C, from 0 V to 1.8 V First voltage holding section: CV charging held at 1.8 V for a predetermined holding time Voltage raise section 2: CC charging at a charging rate of 5 C, from 1.8 V to 4.0 V Next, the secondary battery after initial charging was subjected to AC impedance measurement, the resistance ($R_{sei}$) of the SEI film and the electrostatic capacitance ($C_{sei}$) of the SEI film were measured non-destructively, and the ionic conductivity of the SEI film ($\sigma_C$) was calculated on the basis of the results. The impedance measurement was carried out on N=10 secondary batteries, for each example. The results are given in Table 1 in the column "$\sigma_C$". FIG. 9 illustrates a relationship between voltage holding time and ionic conductivity.

Capacity Retention Rate

The initial capacity of the lithium ion battery for evaluation of each example after initial charging was measured, and thereafter the battery was subjected to 200 cycles of high-temperature, high-rate charging and discharge, each cycle involving charging and discharge at 2 C in a high-temperature environment at 60° C., within a voltage range set to 3.0 V to 4.0 V. Thereafter capacity measurement was performed again, to yield capacity after cycling. The capacity retention rate was calculated on the basis of the following expression: Capacity retention rate (%)=(capacity after cycling/initial capacity)×100. The results are given in Table 1.

TABLE 1

| (Reference) Example | Holding time (min) | $\sigma_C$ ($\times 10^{-9}$ S/cm) | Capacity retention rate (%) |
| --- | --- | --- | --- |
| A1 | 0 | 13.5 | 85 |
| A2 | 2 | 10.2 | 90 |
| A3 | 5 | 8.8 | 93 |
| A4 | 10 | 8.5 | 93 |

FIG. 9 reveals that, immediately after start of CV charging at the first voltage, the ionic conductivity of the SEI film ($\sigma_C$) decreased significantly as the voltage holding time wore on. However, the degree of decrease became then gradually gentler, and took on substantially a constant value of $8.5 \times 10^{-9}$ S/cm after 10 minutes had elapsed. In the present embodiment the degree of decrease in ionic conductivity when 5 minutes of voltage holding time have elapsed is very small. The degree of decrease in ionic conductivity per minute, for a voltage holding time in the range of 2 minutes to 5 minutes, is about $-0.47 \times 10^{-9}$ S/(cm·min), whereas the degree of decrease in ionic conductivity per minute, for a voltage holding time in the range of 5 minutes to 10 minutes, is $-0.06 \times 10^{-9}$ S/(cm·min); it is found that the degree of reduction in ionic conductivity decreases significantly once the voltage holding time exceeds 5 minutes. No difference in capacity retention rate is found between a voltage holding time of 5 minutes and a voltage holding time of 10 minutes. It is thus deemed that in the present embodiment an SEI film is substantially formed sufficiently over a voltage holding time of 5 minutes, and that the ionic conductivity of the SEI film at that time is about $8.8 \times 10^{-9}$ S/cm. From the above it can be concluded that the voltage holding time T1 in the present embodiment can be set to 5 minutes, and the first ionic conductivity σ1 can be set to $8.8 \times 10^{-9}$ S/cm.

Each lithium ion battery for evaluation prepared above was subjected to initial charging using a secondary battery production system having the configuration illustrated in FIG. 4. In initial charging, the first voltage holding time T1 of CV charging at the first voltage was set to 5 minutes, the interval of the second and subsequent AC impedance measurements was set to 2 minutes, and the first ionic conductivity σ1 for which it could be deemed that the SEI film was formed sufficiently was set to $8.8 \times 10^{-9}$ S/cm. Specifically, initial charging involved CC charging at a charging rate of 5 C up to 1.8 V, at 25° C., followed by CV charging for 5 minutes at 1.8 V, whereupon an AC impedance measurement was carried out to calculate an ionic conductivity σx of the SEI film at the time of measurement. As a result, CV charging was terminated if there held σx≤σ1, and CV charging was continued if σx≤σ1 did not hold, with AC impedance measurement being carried out at an interval of 2 minutes; this was continued repeatedly until σx≤σ1 held. After termination of CV charging, CC charging was performed next at a charging rate of 5 C up to 4.0 V, to thereby terminate thus initial charging.

The lithium ion battery having undergone thus an initial charging process was then charged and discharged at a high-temperature and at a high rate, under conditions similar to those of above, and the capacity retention rate before and after the cycles of charging and discharge was calculated. The results are given in Table 2.

TABLE 2

| Impedance measurements (times) | Holding time (min) | $\sigma_C$ (×10$^{-9}$ S/cm) | Capacity retention rate (%) |
|---|---|---|---|
| 1 | 5 | 9.3 | — |
| 2 | 7 | 8.8 | 93 |

*Interval: 2 min

Table 2 reveals that in the present example the relationship σx≤σ1 was achieved once the AC impedance measurement had been performed a total of two times and CV charging was carried out over a total of 7 minutes; CV charging was terminated thereupon. The capacity retention rate of the lithium ion battery having been initially charged was 93%, which was a value identical those in Reference examples A3 and A4 as shown in Table 1. From the above it follows that a lithium ion secondary battery having a superior high-temperature, high-rate cycle characteristic can be produced in accordance with the method disclosed herein while keeping the time of initial charging to the minimum necessary.

Embodiment 2. Minimization of High-Temperature Aging Step

Lithium ion batteries for evaluation were assembled herein similarly to Embodiment 1 above. Each battery assembly was subjected to an initial charging process through CC charging from 0 V to 4.0 V (second voltage), at a high rate of 1.5 C, comparatively low herein, in an environment at 25° C.

Next the battery assembly was subjected to a high-temperature aging process of being held for a predetermined high-temperature aging time in an environment at 60° C., while the second voltage was kept at 4.0 V. The high-temperature aging time was modified in four ways, as given in Table 3, in the range of 0 to 60 hours.

Ionic Conductivity

Figure 10:
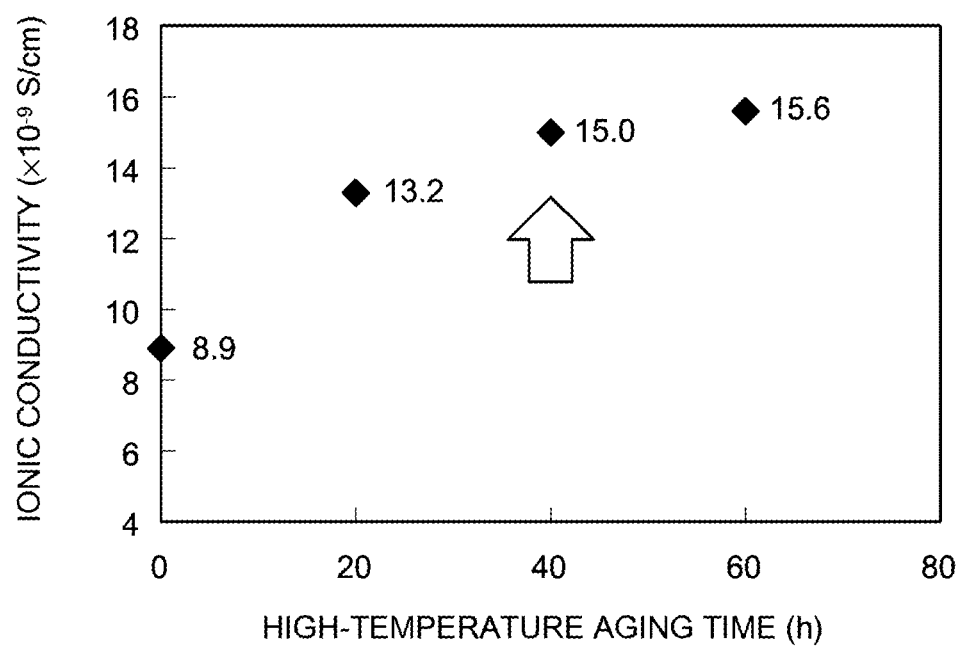
FIG. 10 is a graph illustrating a relationship between high-temperature aging time and ionic conductivity of an SEI film in a high-temperature aging step in an example.

Next, the secondary battery after high-temperature aging was subjected to AC impedance measurement, the resistance ($R_{sei}$) of the SEI film and the electrostatic capacitance ($C_{sei}$) of the SEI film were measured non-destructively, and the ionic conductivity of the SEI film ($\sigma_A$) was calculated on the basis of the results. The impedance measurement was carried out on N=10 secondary batteries, for each example. The results are given in Table 3 in the column "$\sigma_A$". FIG. 10 illustrates a relationship between high-temperature aging time and ionic conductivity.

Capacity Retention Rate

The initial capacity of the lithium ion battery for evaluation of each example after high-temperature aging was measured, and thereafter the battery was subjected to 200 cycles of high-temperature, high-rate charging and discharge, each cycle involving charging and discharge at 2 C in a high-temperature environment at 60° C., within a voltage range set to 3.0 V to 4.0 V. Thereafter capacity measurement was performed again, to yield capacity after cycling. The capacity retention rate was calculated on the basis of the following expression: Capacity retention rate (%)=(capacity after cycling/initial capacity)×100. The results are given in Table 3.

TABLE 3

| (Reference) Example | Aging time (h) | $\sigma_A$ (×10$^{-9}$ S/cm) | Capacity retention rate (%) |
|---|---|---|---|
| B1 | 0 | 8.9 | 85 |
| B2 | 20 | 13.2 | 90 |
| B3 | 40 | 15.0 | 93 |
| B4 | 60 | 15.6 | 92 |

FIG. 10 reveals that immediately following start of high-temperature aging the ionic conductivity of the SEI film ($\sigma_A$) increased significantly as the high-temperature aging time wore on; however, the degree of increase became then gradually gentler, and took on substantially a constant value of 15.6×10$^{-9}$ S/cm after about 60 hours had elapsed. In the present embodiment the degree of increase in ionic conductivity when a high-temperature aging time of 40 hours has elapsed was small, and the degree of increase in ionic conductivity per hour, for a high-temperature aging time in the range of 20 hours to 40 hours, was about 0.09×10$^{-9}$ S/(cm·h), whereas the degree of increase in ionic conductivity per hour, for a high-temperature aging time in the range of 40 hours to 60 hours, was about 0.03×10$^{-9}$ S/(cm·h). The above indicates that the degree of increase in ionic conductivity drops significantly when the high-temperature aging time exceeds 40 hours. No noticeable difference in capacity retention rate could be found between high-temperature aging times of 40 hours and 60 hours. In the present embodiment, therefore, it is considered that an SEI film is substantially formed sufficiently over a high-temperature aging time of 40 hours, and that the ionic conductivity of the SEI film at that time is about 15.0×10$^{-9}$ S/cm. From the above it can be concluded that the high-temperature aging time T2 until the first AC impedance measurement may be set in the present embodiment to 40 hours, and the second ionic conductivity σ2 may be set to 15.0×10$^{-9}$ S/cm. As pointed out above, the high-temperature aging time can vary depending on the composition of the film-forming agent, and also depending on various conditions such as battery configuration, battery materials that are used, battery build, production equipment and so forth.

Each lithium ion battery for evaluation having undergone initial charging under conditions identical to those above was subjected to high-temperature aging using a secondary battery production system having the configuration illustrated in FIG. 4. In high-temperature aging, the first high-temperature aging time T2 was set to 40 hours, the interval of the second and subsequent AC impedance measurements was set to 5 hours, and the second ionic conductivity σ2 for which the SEI film could be deemed to have formed sufficiently was set to 15.0×10$^{-9}$ S/cm. Specifically, high-temperature aging involved CV charging for 40 hours at 4.0 V, after which an AC impedance measurement was carried out to calculate the ionic conductivity σx of the SEI film at the time of measurement. As a result, high-temperature aging was terminated if there held σx≥σ2, while if σx≥σ2 did not hold, high-temperature aging was continued, with AC impedance measurement being carried out at an interval of 5 hours; this was continued repeatedly until σx≥σ2 held, whereupon high-temperature aging was terminated.

The lithium ion battery having undergone thus a high-temperature aging process was charged and discharged at a high-temperature and at a high rate, under conditions similar to those of above, and the capacity retention rate was calculated. The results are given in Table 4.

TABLE 4

| Impedance measurements (times) | Aging time (h) | $\sigma_A$ ($\times 10^{-9}$ S/cm) | Capacity retention rate (%) |
|---|---|---|---|
| 1 | 40 | 14.4 | — |
| 2 | 45 | 15.2 | 93 |

*Interval: 5 h

Table 4 reveals that in the present embodiment the relationship σx≥σ2 was achieved once the AC impedance measurement was performed a total of two times, and high-temperature aging was carried out over a total of 45 hours; high-temperature aging was terminated thereupon. The capacity retention rate of the lithium ion battery having undergone thus high-temperature aging was 93%, which was a value identical to that of Reference example B3 as shown in Table 3. From the above it follows that a lithium ion secondary battery having a superior high-temperature, high-rate cycle characteristic can be produced in accordance with the method disclosed herein while keeping the time of high-temperature aging to the minimum necessary.

Nonaqueous electrolyte secondary batteries typified by lithium secondary batteries are more lightweight and afford higher energy densities than existing batteries, and accordingly have come to be used as so-called portable power sources in personal computers and mobile terminals, and also for instance as power sources for vehicle drive and as residential electric storage devices. In particular, nonaqueous electrolyte secondary batteries have come to be used in recent years as high-output power sources, of large capacity and which are charged and discharged at a high rate, for vehicle drive in vehicles such as electric vehicles (EV), hybrid vehicles (HV) and plug-in hybrid vehicles (PHV). The method and system for producing a nonaqueous electrolyte secondary battery disclosed herein allow producing a battery, in particular, for applications that involve large capacities and high-rate charging and discharge, and such that the battery can be produced with high quality and in a short time, while suppressing variability. Therefore, the method and system for producing a nonaqueous electrolyte secondary battery disclosed herein can be used particularly suitably for producing a battery for such applications that involve large capacities and high-rate charging and discharge.

Concrete examples of the present art have been explained in detail above, but the examples are merely illustrative in nature, and are not meant to limit the scope of the claims in any way. For instance, the embodiments above illustrate a battery provided with a multilayer-type electrode body, as a secondary battery to be charged, but the present art is not limited thereto. For instance, the battery to be charged may be a secondary battery provided with a wound-type electrode body resulting from stacking and winding an elongated positive electrode sheet and an elongated negative electrode sheet, insulated from each other by an elongated separator sheet. The art set forth in the claims of the present application include various alterations and modifications of the concrete examples illustrated above.

What is claimed is:

1. A method for producing a nonaqueous electrolyte secondary battery, the method comprising:
    assembling the nonaqueous electrolyte secondary battery in which a positive electrode, a negative electrode and a nonaqueous electrolyte solution are accommodated in a battery case;
    performing initial charging on the nonaqueous electrolyte secondary battery after assembly, to form an SEI film on a surface of the negative electrode; and
    a high-temperature aging wherein holding, at a high temperature of 40° C. or higher, the nonaqueous electrolyte secondary battery after initial charging,
    wherein the method further comprises at least one of the following sub-steps (A) and (B):
    a sub-step (A) executed in the initial charging step, the sub-step (A) comprising:
        at a first predetermined potential set within a voltage range for forming a coating film in which the SEI film is formed on the surface of the negative electrode, measuring a first AC impedance on the nonaqueous electrolyte secondary battery while maintaining the first predetermined potential, and calculating a first ionic conductivity of the SEI film formed on the surface of the negative electrode of the nonaqueous electrolyte secondary battery, using the first AC impedance measurement; and
        determining whether or not the calculated first ionic conductivity is equal to or lower than a first predetermined ionic conductivity, and maintaining the first predetermined potential when the calculated first ionic conductivity is not equal to or lower than the first predetermined ionic conductivity, and terminating the maintaining of the first predetermined potential when the calculated first ionic conductivity is equal to or lower than the first predetermined ionic conductivity,
    a sub-step (B) executed in the high-temperature aging step, the sub-step (B) comprising:
        at a second predetermined potential set within a voltage range for modification in which the SEI film is modified, measuring a second AC impedance on the nonaqueous electrolyte secondary battery while maintaining the second predetermined potential, and calculating a second ionic conductivity of the SEI film formed on the surface of the negative electrode of the nonaqueous electrolyte secondary battery, using the second AC impedance measurement; and
        determining whether or not the calculated second ionic conductivity is equal to or higher than a second predetermined ionic conductivity, and maintaining the second predetermined potential when the calculated second ionic conductivity is not equal to or higher than the second predetermined ionic conductivity, and terminating the maintaining of the second predetermined potential when the calculated second ionic conductivity is equal to or higher than the second predetermined ionic conductivity.

2. The production method according to claim 1, wherein the negative electrode comprises a carbon material as a negative electrode active material.

3. The production method according to claim 1, wherein the nonaqueous electrolyte solution comprises an oxalato complex compound containing at least one of a boron atom and a phosphorus atom, as a film-forming agent for forming the SEI film.

4. The production method according to claim 1, wherein the sub-step (A) is repeatedly executed in a shortest time from the first AC impedance measurement until termination of the determination as to whether or not the calculated first ionic conductivity is equal to or lower than the first predetermined ionic conductivity is satisfied.

5. The production method according to claim 1, wherein the sub-step (B) is repeatedly executed in a shortest time from the second AC impedance measurement until termination of a determination as to whether or not the calculated second ionic conductivity is equal to or higher than the predetermined second ionic conductivity is satisfied.

* * * * *